United States Patent
Hasegawa (10) Patent No.: US 8,010,110 B2
(45) Date of Patent: Aug. 30, 2011

(54) MOBILE COMMUNICATION SYSTEM, MAINTENANCE TERMINAL, ADJACENT CELL INFORMATION OPTIMIZING METHOD, PROGRAM, AND RECORDING MEDIUM

(75) Inventor: Yasuhiro Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 261 days.

(21) Appl. No.: 12/482,738

(22) Filed: Jun. 11, 2009

(65) Prior Publication Data
US 2009/0312025 A1 Dec. 17, 2009

(30) Foreign Application Priority Data
Jun. 13, 2008 (JP) ................ P2008-155745

(51) Int. Cl.
*H04W 36/00* (2009.01)
(52) U.S. Cl. ........ 455/436; 455/446; 455/560; 455/525; 455/435.1
(58) Field of Classification Search .............. 455/436, 455/437, 446
See application file for complete search history.

(56) References Cited

U.S. PATENT DOCUMENTS

| 6,119,005 | A * | 9/2000 | Smolik | 455/436 |
| 6,138,018 | A * | 10/2000 | Pashtan et al. | 455/435.2 |
| 6,438,377 | B1 * | 8/2002 | Savolainen | 455/439 |
| 2008/0002628 | A1 | 1/2008 | Bi et al. | |

FOREIGN PATENT DOCUMENTS

| EP | 0986279 | A | 3/2000 |
| JP | 2002369236 | A | 12/2002 |
| JP | 2003259433 | A | 9/2003 |
| JP | 2006270207 | A | 10/2006 |
| WO | 2008054072 | A | 5/2008 |

OTHER PUBLICATIONS

European Search Report for EP 09 16 2637 completed Sep. 29, 2009.

* cited by examiner

*Primary Examiner* — Kamran Afshar
*Assistant Examiner* — Yousef R Rod (57) ABSTRACT

A maintenance terminal comprises a detected cell information collection unit that collects detected cell information including identification information of a handover original cell and identification information of a cell as an expected movement destination from a radio network controller, a detection count record unit that records the number of detection times that the relationship between the identification information of the handover original cell and the identification information of the cell as the detected expected movement destination is determined as not included in the relationship between the identification information of the handover original cell and the identification information of the adjacent cells recorded in the radio network controller, based on the collection of the detected cell information, and an adjacent cell information additional-registration unit that additionally registers the relationship between the identification information of the handover original cell and the identification information of the adjacent cells corresponding to the number of detection times in the adjacent cell information, when the number of detection times exceeds a threshold value.

7 Claims, 5 Drawing Sheets

| HANDOVER ORIGINAL CELL ID | DETECTED SET CELL (1) | | DETECTED SET CELL (2) | | DETECTED SET CELL (3) | |
|---|---|---|---|---|---|---|
| | Cell ID | NUMBER OF TIMES | Cell ID | NUMBER OF TIMES | Cell ID | NUMBER OF TIMES |
| 1 | 7 | 55 | 9 | 10 | 10 | 10 |

MOBILE COMMUNICATION SYSTEM, MAINTENANCE TERMINAL, ADJACENT CELL INFORMATION OPTIMIZING METHOD, PROGRAM, AND RECORDING MEDIUM

Priority is claimed on Japanese Patent Application No. 2008-155745, filed Jun. 13, 2008, the content of which is incorporated herein by reference.

BACKGROUND OF THE INVENTION

1. Field of the Invention

The present invention relates to a mobile communication system, a maintenance terminal, an adjacent cell information optimizing method, a program, and a recording medium.

2. Description of Related Art

In 3G (Third Generation) mobile systems, it is necessary to perform a handover process to continue communication while a mobile communication terminal (UE: User Equipment) is moved. The handover process is a process of changing a communication connection base station to another base station, in order, in the course of movement. In the 3G mobile systems using W-CDMA (Wideband Code Division Multiple Access), a handover process during call connection is controlled by a radio resource control (RRC) message. The radio resource control message is transmitted and received between a mobile communication terminal (UE) and a radio network Controller (RNC).

In the handover process, peripheral cell information is registered in a data base for adjacent cell information on the radio network controller (RNC) side. The peripheral cell information is information based on cells within a communicable range of the base station connected to the mobile communication terminal (UE), and it is the information of peripheral cells that is a handover target. The peripheral cell information is transmitted at the time of adding cell information based on the movement of the mobile communication terminal (UE). In an actual handover process, the mobile communication terminal (UE) sequentially monitors the reception quality of radio signals received from the base station based on the transmitted peripheral cell information. When the reception quality of radio signals received from the base station in a cell of a movement destination exceeds a regulated threshold value in the course of movement, the mobile communication terminal (UE) transmits a request signal of connection to the cell to the radio network controller (RNC). Then, the mobile communication terminal (UE) is connected to the base station of the handover destination. The information of the peripheral cells, to which the signal is not transmitted from the radio network controller (RNC), are only transmitted as information of detected set cells from the mobile communication network (UE) to the radio network controller (RNC). In addition, when the reception quality of pilot radio signals transmitted from the base stations of the peripheral cells exceeds a regulated threshold value, the mobile communication terminal (UE) cannot perform the handover process. A technique regarding handover in a mobile communication system is disclosed in Patent Document 1 of Japanese Patent Application Laid-Open No. 2002-369236.

The adjacent cell information of each cell is registered in the data base of the radio network controller (RNC) as described above. The data base is manually registered by a network operator based on base station (cell) design information. The data base is frequently renewed by network expansion. In this case, the adjacent cell information of each cell is manually managed and renewed. For this reason, particularly, in a city or the like where peripheral cells are close together, when additional base station (Node B) bodies are installed or when additional radio frequency blocks are installed, omission of information with regard to handover destination may occur due to artificial mistakes such as cell information registration mistakes. In addition, trouble in a call connection process may occur at a cell edge (vicinity of the boundary between cells) based on the problems in the handover process.

SUMMARY

The invention is to provide a mobile communication system, a maintenance terminal, an adjacent cell information optimizing method, a program, and a recording medium, capable of reducing call connection trouble based on a problems in a handover process.

[Means for Solving the Problem]

According to a first aspect of the invention, there is provided a mobile communication system including: a plurality of base stations that constitute a plurality of cells as communication ranges; a radio network controller that controls the communication of mobile terminals in the cells; and a maintenance terminal that registers adjacent cell information in the radio network controller, the adjacent cell information including identification information of a handover original cell and identification information of adjacent cells adjacent to the handover original cell in the movement of the mobile terminals, wherein the radio network controller comprises; an adjacent cell information storage unit that stores the adjacent cell information; an adjacent cell information communication unit that transmits the adjacent cell information to the mobile terminals in the cells; and a detected cell information reception unit that receives detected cell information including the identification information of the handover original cell and identification information of a cell as an expected movement destination from a mobile terminal determining that a relationship between the identification information of the handover original cell and the identification information of the cell as the detected expected movement destination is not included in a relationship between the identification information of the handover original cell and the identification information of the adjacent cells recorded in the adjacent cell information, and wherein the maintenance terminal comprises; a detected cell information collection unit that collects the detected cell information from the radio network controller; a detection count record unit that records the number of detection times that the relationship between the identification information of the handover original cell and the identification information of the cell as the detected expected movement destination is determined, as not included in the relationship between the identification information of the handover original cell and the identification information of the adjacent cells recorded in the adjacent cell information, based on the collection of the detected cell information; and an adjacent cell information additional-registration unit that additionally registers the relationship between the identification information of the handover original cell and the identification information of the adjacent cells corresponding to the number of detection times in the adjacent cell information, when the number of detection times exceeds a threshold value.

In the mobile communication system, it is preferable that the maintenance terminal comprises an additional recommendation information output unit that outputs the identification information of the handover original cell and the identification information of the adjacent cells corresponding to the number of detection times, as additional recommendation information for the adjacent cell information, when the number of detection times exceeds the threshold value, and it is preferable that the adjacent cell information additional-registration unit additionally registers the relationship between the identification information of the handover original cell and the identification information of the adjacent cells corresponding to the number of detection times in the adjacent cell information, when an input of registration instruction information is received according to the additional recommendation information.

According to a second aspect of the invention, there is provided a maintenance terminal communicating with a plurality of base stations that constitute a plurality of cells as communication ranges, and a radio network controller that controls communication of mobile terminals in the cells, and registering adjacent cell information in the radio network controller, the adjacent cell information including identification information of a handover original cell and identification information of adjacent cells adjacent to the handover original cell in the movement of the mobile terminals, the maintenance terminal including: a detected cell information collection unit that collects detected cell information including the identification information of the handover original cell and identification information of a cell as an expected movement destination from the radio network controller; a detection count record unit that records the number of detection times that the relationship between the identification information of the handover original cell and the identification information of the cell as the detected expected movement destination is determined as not included in the relationship between the identification information of the handover original cell and the identification information of the adjacent cells recorded in the radio network controller, based on the collection of the detected cell information; and an adjacent cell information additional-registration unit that additionally registers the relationship between the identification information of the handover original cell and the identification information of the adjacent cells corresponding to the number of detection times in the adjacent cell information, when the number of detection times exceeds a threshold value.

According to a third aspect of the invention, there is provided an adjacent cell information optimizing method in a mobile communication system including a plurality of base stations that constitute a plurality of cells as communication ranges, a radio network controller that controls communication of mobile terminals in the cells, and a maintenance terminal that registers adjacent cell information in the radio network controller, the adjacent cell information including identification information of a handover original cell and identification information of adjacent cells adjacent to the handover original cell in the movement of the mobile terminals, the method including: storing the adjacent cell information by an adjacent cell information storage unit of the radio network controller; transmitting the adjacent cell information to the mobile terminals in the cells by an adjacent cell information communication unit of the radio network controller; receiving detected cell information including the identification information of the handover original cell and identification information of a cell as an expected movement destination from a mobile terminal in which it is determined that a relationship between the identification information of the handover original cell and the identification information of the cell as the detected expected movement destination is not included in a relationship between the identification information of the handover original cell and the identification information of the adjacent cells recorded in the adjacent cell information, by a detected cell information reception unit of the radio network controller; collecting the detected cell information from the radio network controller by a detected cell information collection unit of the maintenance terminal; recording the number of detection times that the relationship between the identification information of the handover original cell and the identification information of the cell as the detected expected movement destination is determined as not included in the relationship between the identification information of the handover original cell and the identification information of the adjacent cells recorded in the adjacent cell information, based on the collection of the detected cell information, by a detection count record unit of the maintenance terminal; and additionally registering the relationship between the identification information of the handover original cell and the identification information of the adjacent cells corresponding to the number of detection times in the adjacent cell information, when the number of detection times exceeds a threshold value, by an adjacent cell information additional-registration unit of the maintenance terminal.

According to a fourth aspect of the invention, there is provided an adjacent cell information optimizing method in a maintenance terminal communicating with a plurality of base stations that constitute a plurality of cells as communication ranges, and a radio network controller that controls communication of mobile terminals in the cells, and registering adjacent cell information in the radio network controller, the adjacent cell information including identification information of a handover original cell and identification information of adjacent cells adjacent to the handover original cell in the movement of the mobile terminals, the method including; collecting detected cell information including the identification information of the handover original cell and identification information of a cell as an expected movement destination from the radio network controller by a detected cell information collection unit; recording the number of detection times that the relationship between the identification information of the handover original cell and the identification information of the cell as the detected expected movement destination is determined as not included in the relationship between the identification information of the handover original cell and the identification information of the adjacent cells recorded in the adjacent cell information, based on the collection of the detected cell information, by a detection count record unit; and additionally registering the relationship between the identification information of the handover original cell and the identification information of the adjacent cells corresponding to the number of detection times in the adjacent cell information, when the number of detection times exceeds a threshold value, by an adjacent cell information additional-registration unit.

According to a fifth aspect of the invention, there is provided a program for causing a computer of a maintenance terminal communicating with a plurality of base stations that constitute a plurality of cells as communication ranges, and a radio network controller that controls communication of mobile terminals in the cells, and registering adjacent cell information in the radio network controller, the adjacent cell information including identification information of a handover original cell and identification information of adjacent cells adjacent to the handover original cell in the movement of the mobile terminals, the program executing: a detected cell information collection process of collecting detected cell information including the identification information of the handover original cell and identification information of a cell as an expected movement destination from the radio network controller; a detection number-of-times record process of recording the number of detection times that the relationship between the identification information of the handover original cell and the identification information of the cell as the detected expected movement destination is determined as not included in the relationship between the identification information of the handover original cell and the identification information of the adjacent cells recorded in the adjacent cell information, based on the collection of the detected cell information; and an adjacent cell information additional-registration process of additionally registering the relationship between the identification information of the handover original cell and the identification information of the adjacent cells corresponding to the number of detection times in the adjacent cell information, when the number of detection times exceeds a threshold value.

According to a sixth aspect of the invention, there is provided a computer-readable recording medium in which the program is recorded.

The mobile communication system, the maintenance terminal, the adjacent cell information optimizing method, the program, and the recording medium can reduce call connection trouble based on a problems in a handover process.

DETAILED DESCRIPTION OF PREFERRED EMBODIMENTS

Hereinafter, a mobile communication system according to an embodiment of the invention will be described with reference to the drawings.

Figure 1:
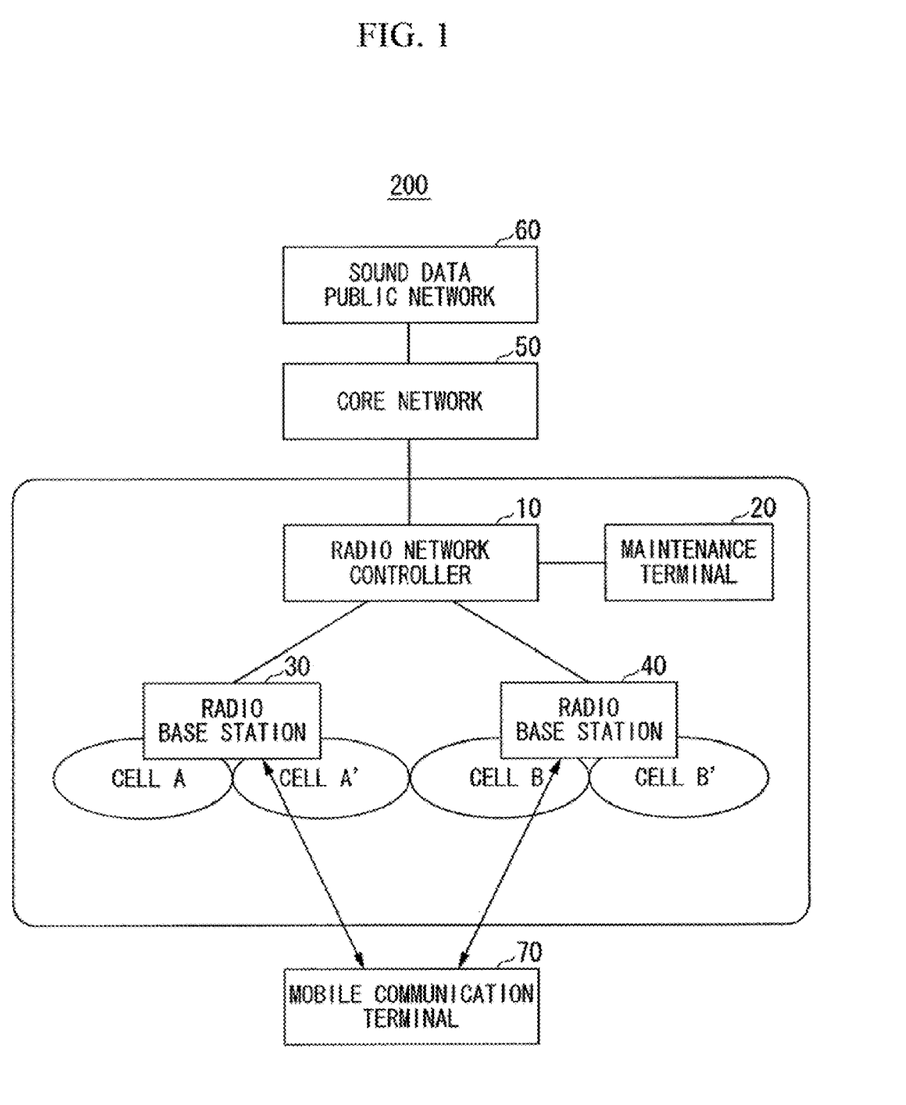
FIG. 1 is a block diagram illustrating a configuration of a mobile communication system.

FIG. 1 is a block diagram illustrating a configuration of a mobile communication system 200 applied to a 3G mobile system according to the embodiment.

In FIG. 1, the mobile communication system 200 is applied to the 3G mobile system. The mobile communication system 200 includes a radio network controller (RNC) 10, a maintenance terminal 20, a radio base station 30, a radio base station 40, a core network (CN) 50, a sound data public network 60, a mobile communication terminal (UE) 70.

The core network 50 is connected to the radio network controller 10.

The sound data public network 60 is connected to the radio network controller 10 through the core network 50.

The radio base station 30 (Node A) and the radio base station 40 (Node B) are connected to the radio network controller 10.

The radio network controller 10 and the maintenance terminal 20 perform a process of optimizing 3G adjacent cells by collecting the detected set. The process will he described later.

The radio network controller 10 transmits communication data such as control data for a call process and sound data to the radio base station 30, the radio base station 40, and the core network 50. The radio network controller 10 performs radio resource controls such as a convergence control, a call reception control, a power control, and a handover process, using setting values set by the maintenance terminal 20. The maintenance terminal 20 is used for network maintenance work performed by an operator.

The radio base station 30 forms a cell A and a cell A' as service areas (ranges reaching radio signals). The radio base station 40 forms a cell B and a cell B' as service areas.

In FIG. 1, for convenience of description, each of the radio base station 30 and the radio base station 40 forms two cells by way of example, but the number of cells formed by one radio base station is random. In FIG. 1, for convenience of description, only two radio base stations of the radio base station 30 and the radio base station 40 are shown as radio base stations, but the number of radio base stations is random.

The mobile communication terminal 70 performs mobile communication while moving (handover) between the cells formed by the radio base stations 30 and the radio base stations 40.

Figure 2:
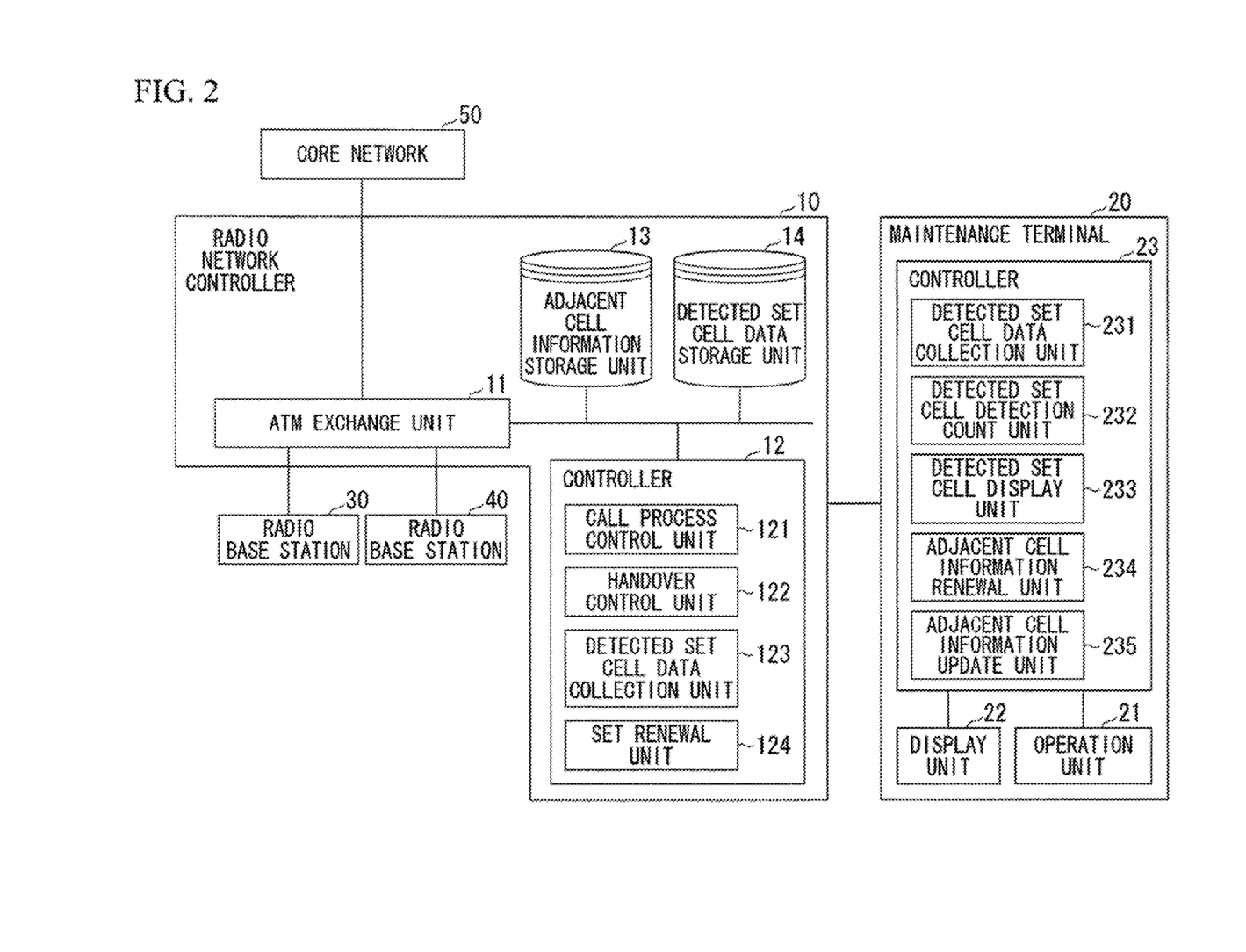
FIG. 2 is a functional block diagram illustrating a radio network controller and a maintenance terminal.

FIG. 2 is a functional block diagram illustrating the radio network controller 10 and the maintenance terminal 20.

Functions of the radio network controller 10 and the maintenance terminal 20 will be described. In FIG. 2, the core network 50, the radio base station 30, and the radio base station 40 are shown in addition to the radio network controller 10 and the maintenance terminal 20.

As shown in FIG. 2, the radio network controller 10 includes an ATM exchange unit (Asynchronous Transmission Mode) 11, a controller 12, an adjacent cell information storage unit 13, and a detected set cell data storage unit 14.

The controller 12 includes a call process control unit 121, a handover control unit 122, a detected set cell data collection unit 123, and a set renewal unit 124. The controller 12 of the radio network controller 10 includes, for example, a CPU, a ROM, and RAM. The CPU performs various control operations. The ROM stores programs for control of the CPU. The RAM serves as a work area of the CPU or the like. The controller 12 performs functions of the call process control unit 121, the handover control unit 122, the detected set cell data collection unit 123, and the set renewal unit 124 by performing the programs stored in the ROM.

The ATM exchange unit 11 is connected to the core network 50, the radio base station 30, and the radio base station 40.

The ATM exchange unit 11 processes a control signal of call connection request or the like, based on the control of the call process control unit 121 of the controller 12. Accordingly, the ATM exchange unit 11 connects the mobile communication terminal 70 to another mobile communication terminal 70, or is connected to a call between the mobile communication terminal 70 and the public network.

The handover control unit 122 of the controller 12 allows the mobile communication terminal 70 (see FIG. 1) to continue communication (handover) while moving between the cell (cell A or cell A') formed by the radio base station 30 and the cell (cell B or cell B') formed by the radio base station 40. To continue the communication, the handover control unit 122 secures line connection between the ATM exchange unit 11 of the radio network controller 10 and both the radio base station 30 and the radio base station 40.

The adjacent cell information storage unit 13 stores cell setting information set by the maintenance terminal 20, based on the control of the set renewal unit 124 of the controller 12. The cell setting information includes adjacent cell information formed of an adjacent cell list to be described later.

The detected set cell data storage unit 14 stores and accumulates information collected by the detected set cell data collection unit 123 of the controller 12, under the control of the detected cell data collection unit 123. The information collected by the detected set cell data collection unit 123 includes information (to be described in detail later) for specifying handover original and handover destination cells transmitted from the mobile communication terminal 70 whenever the mobile communication terminal 70 performs the handover process.

The maintenance terminal 20 includes an operation unit 21, a display unit 22, and a controller 23.

The operation unit 21 receives a change operation or the like of the cell setting information stored in the adjacent cell information storage unit 13 of the radio network controller 10 from the operator. The cell setting information includes an RNC setting value formed of an adjacent cell list to be described later.

The display unit 22 performs a display operation of various kinds of information.

The controller 23 includes a detected set cell data collection unit 231, a detected set cell detection count unit 232, a detected set cell display unit 233, an adjacent cell information renewal unit 234, and an adjacent cell information update unit 235.

The detected set cell data collection unit 231 downloads the information accumulated in the detected set cell data storage unit 14 of the radio network controller 10.

The detected set cell detection count unit 232 visibly processes the downloaded data for the operator, and allows the display unit 22 to display the data.

The adjacent cell information renewal unit 234 determines whether or not the detected set cell is added as an adjacent cell.

The adjacent cell information update unit 235 adds the detected set cell as a new adjacent cell.

Operation

Figure 3:
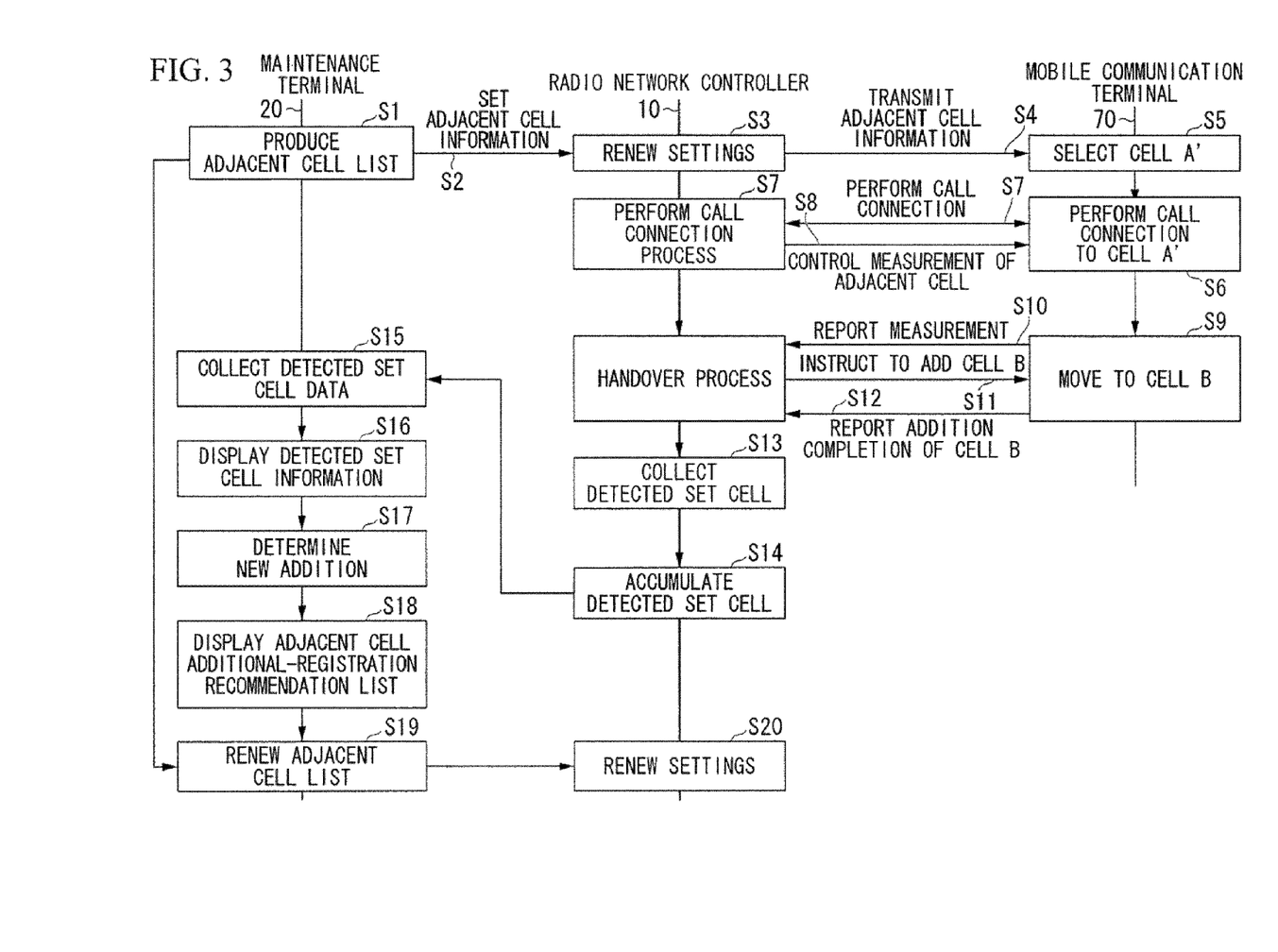
FIG. 3 is a first flowchart illustrating a process of the mobile communication system.

FIG. 3 is a first flowchart illustrating a process of the mobile communication system applied to the 3G mobile system.

Figure 4:
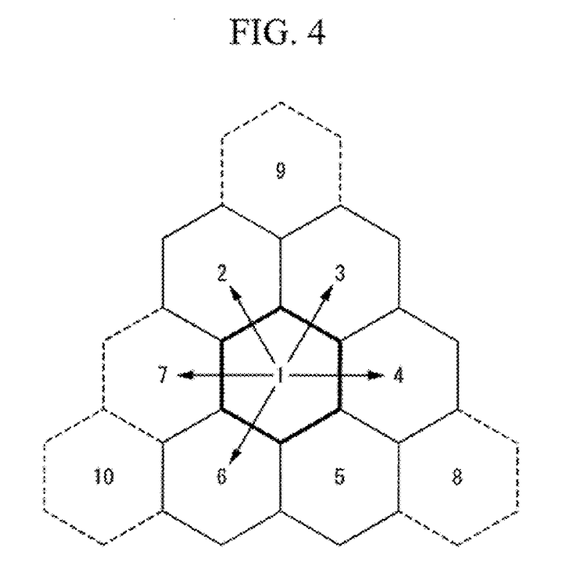
FIG. 4 is a diagram illustrating a dispositional example of peripheral cells of a cell A'.

FIG. 4 is a diagram illustrating a dispositional example of peripheral cells of a cell A'.

Next, the process flow of the mobile communication system applied to the 3G mobile system will be described in detail.

As shown in FIG. 3, the operator of the maintenance terminal 20 produces an adjacent cell list (Step S1). The operator produces the adjacent cell list based on information about what cell is located around for each cell by base station design designed by a network designer (generally, the operator).

As shown in FIG. 4, in the adjacent cell list, an ID (ID=1 of cell A', etc.) corresponding to each cell is recorded. Accordingly, information of a handover original cell and adjacent cells adjacent to the handover original cell is stored. That is, as shown in FIG. 4, when the cell A' (ID=1) is set as the handover original cell, the second to sixth cells (ID=2 to 6), as candidates (peripheral cells) of a handover destination, are stored correspondingly as the adjacent cell list.

Peripheral cells (ID=7 to 10) which are not set as the adjacent cell list do not becomes a candidate of the handover destination, for example, even when the cell (ID=7) is located close to the cell A' (ID=1). When each of the cells other than the cell A' is set as a handover original cell, an adjacent cell list representing candidates (peripheral cells) of a handover destination is also produced. For convenience of description, as shown in FIG. 4, only the adjacent cell list for the cell A' will be described. Hereinafter, the list of the cell as the candidate of the handover destination is used when the cell A' is set as the handover original cell.

Next, the operator of the maintenance terminal 20 registers and sets the adjacent cell information of the cell A' in the radio network controller 10, based on the adjacent cell list produced in Step S1 (Step S2). Accordingly, the adjacent cell information (adjacent cell list) of the cell A' is recorded in the adjacent cell information storage unit 13 of the radio network controller 10. In this case, the adjacent cells of the cell A' are the cell (ID=2) to the cell (ID=6) as described above. In addition, in FIG. 4, these cells are represented only by the numerals "1" to "6". The numerals "1" to "6" shown in FIG. 4 also indicate the ID of the first to sixth cells.

When the adjacent cell information is registered and set in Step S2, the radio network controller 10 renews the adjacent cell information for the cell A' in the adjacent cell information storage unit 13, based on the control of the set renewal unit 124 (Step S3).

The controller 12 of the radio network controller 10 transmits the setting of the cell A' to the mobile communication terminal 70 located within the range of the cell A' through the radio base station 30. That is, the controller 12 transmits the adjacent cell information renewed in Step S3 to the mobile communication terminal 70 (Step S4).

The mobile communication terminal 70 selects the cell A' (Step S5).

The mobile communication terminal 70 located within the range of the cell A' performs call connection (call connection to the cell A') to a fixed network or another mobile communication terminal through the radio base station 30 (Step S6).

The call process control unit 121 of the radio network controller 10 performs a call connection process between the mobile communication terminal 70 located within the range of the cell A' and another mobile communication terminal for communication (Step S7).

Herein, assuming that this call connection process succeeds and the call is connected as normal, the following description continues. At the time of the call connection process, the call process control unit 121 of the radio network controller 10 transmits the adjacent cell information (cell ID=2 to 6, the cell B is cell ID=4) of the cell A' (cell ID=1) and a threshold value of the handover to the mobile communication terminal 70.

Accordingly, the mobile communication terminal 70 starts measuring reception quality from the adjacent cells (Step S8). In the course of performing the communication started by the call connection process, it is assumed that the mobile communication terminal 70 is moved and thus becomes closer to the cell B (cell ID=4) (Step S9) from the cell A' (cell ID=1). As a result, the mobile communication terminal 70 detects the signal transmitted from the radio base station 40 of the cell B. Then, the mobile communication terminal 70 determines whether or not the difference (difference in reception quality between the cell A' and the cell B) of reception quality (Ec/No) of common pilot channels (CPICH) received from the cell A' (cell ID=1) and the cell B (cell ID=4) is below a handover threshold value. When it is determined that the difference is below the handover threshold value, the mobile communication terminal 70 transmits a measurement report including the reception quality of the cell B and a scrambling code (SC) to the radio network controller 10 through the radio base station 30 (Step S10).

When the mobile communication terminal 70 is connected to the radio base station 40 of the cell B by communication, the radio network controller 10 determines whether or not a radio resource of the cell B is overloaded. When the radio network controller 10 determines that the radio resource is not overloaded, the radio network controller 10 instructs the mobile communication terminal 70 to add the cell B as a radio line of a new communication destination through the radio base station 30 (Step S11). The mobile communication terminal 70 performs a process of adding the cell B according to the instruction (instruction of adding the cell B) from the radio network controller 10. When the adding process is completed, the mobile communication terminal 70 transmits a signal of the completion of the adding process to the radio network controller 10 through the radio base station 30 (Step S12: transmission of the addition completion of the cell B).

In Step S10, when the cells (expected movement destination) which are not registered as the adjacent cells in the adjacent cell information storage unit 13 in the mobile communication terminal 70 are detected based on the reception signal, the following process is performed. That is, the mobile communication terminal 70 transmits cell ID of the cells and cell ID of the handover original cell as detected set (detected cell information) cells to the radio network controller 10.

The information of the detected set cells transmitted from the mobile communication terminal 70 is collected by the detected set cell data collection unit 123 of the radio network controller 10 (Step S13).

The detected set cell data collection unit 123 accumulates and stores the cell ID of the handover original cell and the cell ID of the detected set cells to be associated with one another, as detected cell data, in the detected set cell data storage unit 14 of the radio network controller 10 (Step S14).

Next, the detected set cell data accumulated and stored in the detected set cell data storage unit 14 of the radio network controller 10 is collected by the detected set cell data collection unit 231 of the controller 23 of the maintenance terminal 20 (Step S15).

The detected set cell data collected by the detected set cell data collection unit 231 of the controller 23 of the maintenance terminal 20 is processed by the detected set cell display unit 233. The detected set cell display unit 233 displays the detected set cell list shown in FIG. 5 on the display unit 22. The cell ID of the handover original cell, the cell ID detected as the detected set from the cell, and the number of detection times are displayed as the detected set cell list (Step S16).

Figure 5:
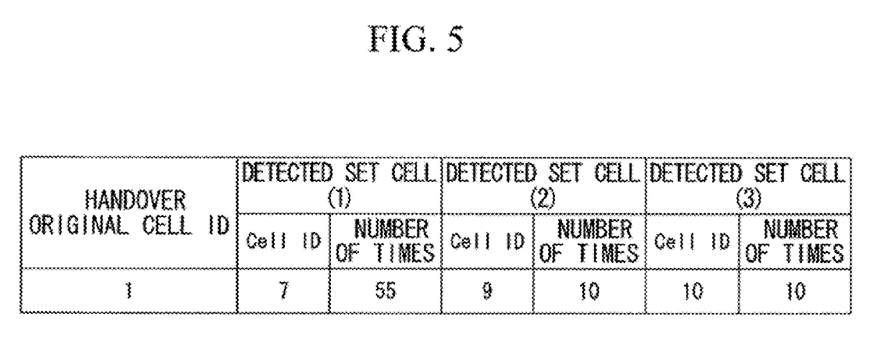
FIG. 5 is a diagram illustrating a detected set cell list.

In the detected set cell list shown in FIG. 5, the number of the detected set cells which can be displayed is limited to 3. The number of displayed detected set cells is changed and set by the detected set cell display unit 233 based on the instruction from the operation unit 21 of the maintenance terminal 20.

The adjacent cell information renewal unit 233 of the controller 23 of the maintenance terminal 20 determines whether or not the detected set cell detected for each cell is added as new adjacent cell data, based on the data of the detected set cell list produced in the detected set cell display unit 233 (Step S17).

The detected set cell display unit 233 displays an additional registration recommendation list representing the adjacent cell data determined to be added as the new adjacent cell data (Step S18).

The adjacent cell information update unit 235 of the controller 23 of the maintenance terminal 20 newly registers the detected set cell determined to be added as the adjacent cell information. Accordingly, the maintenance terminal 20 performs renewal of the adjacent cell list (Step S19). The renewal information is transmitted from the maintenance terminal 20 to the radio network controller 10. The radio network controller 10 performs renewal of the adjacent cell list (Step S20).

Figure 6:
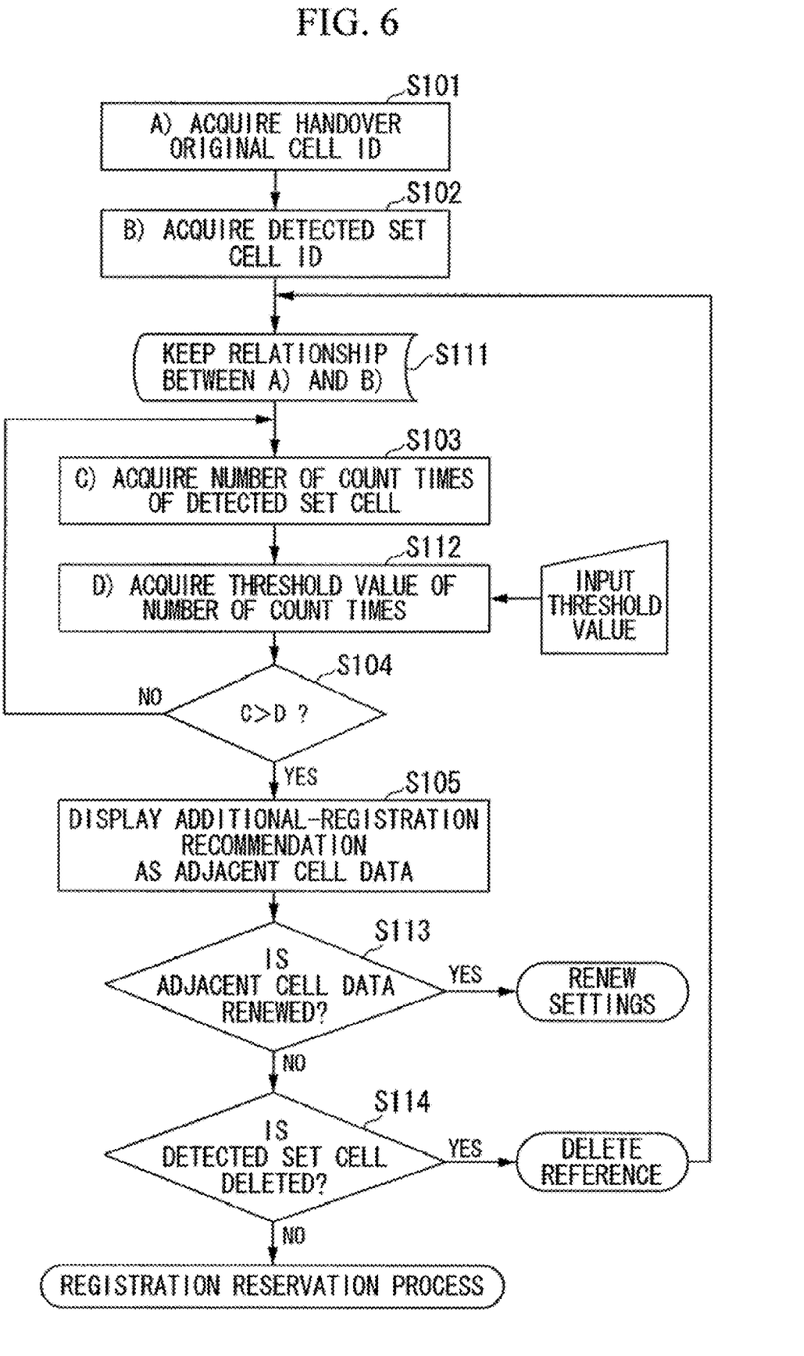
FIG. 6 is a second flowchart illustrating a process of the mobile communication system.

FIG. 6 is a second flowchart illustrating a process of the mobile communication system applied to the 3G mobile system.

Hereinafter, the determination whether or not the detected set cell detected for each cell is added as the new adjacent cell data will be described in detail with reference to FIG. 6.

The adjacent cell renewal unit 233 of the controller 23 of the maintenance terminal 20 acquires the cell ID of the handover original cell relating to any detected set cell from the data of the detected set cell list (Step S101).

The adjacent cell renewal unit 233 acquires the cell ID transmitted as the detected set cell (Step S102).

The adjacent cell renewal unit 233 stores a relationship between the cell ID acquired in Step S101 and the cell ID acquired in Step S102 (Step S111).

Then, the detected set cell detection count unit 232 acquires the number of count times of the detected set cell ID acquired in Step S102 (Step S103).

The maintenance terminal 20 acquires a threshold value of the number of count times input from the operation unit 21 (Step S112).

The adjacent cell information renewal unit 233 determines whether or not the number of count times acquired in Step S103 is larger than the threshold value of the number of count times acquired in Step S104 (Step S104).

When the number of count times exceeds the threshold value, the display unit 22 displays the detected set cell as adjacent cell data in an additional registration recommendation list (Step S105).

The adjacent cell information renewal unit 234 renews the adjacent cell data (Step S113). The adjacent cell information renewal unit 234 deletes the detected set cell ID kept in Step S111 (Step S114).

The threshold value of the number of count times of the detected set cell ID may be freely set by the operator. If the threshold value of the number of count times is set to 50 by the operator, in the case of the detected set cell list shown in FIG. 5, the cell of cell ID=7 as the detected set cell about the cell A' (cell ID=1) is recommended for registration as a new adjacent cell.

The mobile communication system according to the embodiment of the invention includes the plurality of radio base stations 30 and 40 (also referred to as base stations) constituting the plurality of cells as the communication ranges, and includes the radio network controller 10 that controls communication of the mobile communication terminal 70 (also referred to as mobile terminal) located in the cells. In addition, the mobile communication system includes the maintenance terminal 20 that registers the adjacent cell information in the radio network controller 10, and the adjacent cell information includes the identification information of the handover original cell and the identification information of the cells adjacent to the handover original cell in the movement of the mobile communication terminal 70.

The radio network controller 10 includes the adjacent cell information storage unit 13 that stores the adjacent cell information.

The radio network controller 10 includes the ATM exchange unit 11 (also referred to as the adjacent cell information communication unit) that transmits the adjacent cell information to the mobile terminal 70 located in the cell.

The radio network controller 10 includes the ATM exchange unit 11 (also referred to as the detected cell information reception unit) that receives detected cell information including the identification information of the handover original cell and the identification information of the cell as the expected movement destination from the mobile terminal 70 determining that the relationship between the identification information of the handover original cell and the identification information of the cell as the detected expected movement destination is not included in the relationship between the identification information of the handover original cell and the identification information of the adjacent cells recorded in the adjacent cell information.

The maintenance terminal 20 includes the detected set cell data collection unit 231 (also referred to as the detected cell information collection unit) that collects the detected cell information front the radio network controller 10.

The maintenance terminal 20 includes the detected set cell detection count unit 232 (also referred to as the detection count record unit) that records the number of detection times that the relationship between the identification information of the handover original cell and the identification information of the cell as the detected expected movement destination is determined as not included in the relationship between the identification information of the handover original cell and the identification information of the adjacent cells recorded in the adjacent cell information, based on the collection of the detected cell information.

The maintenance terminal 20 includes the adjacent cell information renewal unit 234 (also referred to as the adjacent cell information additional-registration unit) that additionally registers the relationship between the identification information of the handover original cell and the identification information of the adjacent cells corresponding to the number of detection times in the adjacent cell information, when the number of detection times exceeds the threshold value.

The maintenance terminal 20 includes the adjacent cell information update unit 235 (also referred to as the additional recommendation information output unit) that outputs, as additional recommendation information for the adjacent cell, information, the Identification information of the handover original cell and the identification information of the adjacent cells corresponding to the number of detection times when the number of detection times exceeds the threshold value.

The adjacent cell information renewal unit 234 additionally registers the relationship between the identification information of the handover original cell and the identification information of the adjacent cells corresponding to the number of detection times in the adjacent cell information, when the input of registration instruction information is received according to the additional recommendation information.

The embodiment of the invention has been described above. According to the above-described process, when the number of detection times of the detected set cell exceeds the threshold value, it is automatically recommended that the detected set cell is registered as the adjacent cell of the handover original cell. For this reason, it is possible to easily install additional base stations in a city or the like where peripheral cells are close together. In addition, it is possible to easily carry out the registration of adjacent cell information in an area where a large number of additional radio frequency blocks are installed. For this reason, it is possible to reduce the burden on the operator. In addition, it is possible to reduce the possibility of occurrence of call blocking of mobile communication at a cell edge, by artificial mistakes such as cell information registration mistakes and omission of a handover destination.

The above-described devices have a computer system therein. The above-described processes are stored in a computer-readable recording medium in a program type. A computer reads and executes the program, thereby performing the processes. The computer-readable recording medium means a magnetic disk, an optical magnetic disk, a CD-ROM, a DVD-ROM, a semiconductor memory, or the like. The computer program may be distributed to computers through communication lines, and the computer receiving the program may execute the program.

The program may be for realizing part of the above-described functions. The above-described functions may be a so-called differential file (differential program) which can be realized by combination with a program previously recorded in a computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A mobile communication system comprising:
a plurality of base stations that constitute a plurality of cells as communication ranges;
a radio network controller that controls communication of mobile terminals in the cells; and
a maintenance terminal that registers adjacent cell information in the radio network controller, the adjacent cell information including identification information of a handover original cell and identification information of adjacent cells adjacent to the handover original cell in the movement of the mobile terminals,
wherein the radio network controller comprises:
an adjacent cell information storage unit that stores the adjacent cell information;
an adjacent cell information communication unit that transmits the adjacent cell information to the mobile terminals in the cells; and
a detected cell information reception unit that receives detected cell information including the identification information of the handover original cell and identification information of a cell as an expected movement destination from a mobile terminal determining that a relationship between the identification information of the handover original cell and the identification information of the cell as the detected expected movement destination is not included in a relationship between the identification information of the handover original cell and the identification information of the adjacent cells recorded in the adjacent cell information, and
wherein the maintenance terminal comprises:
a detected cell information collection unit that collects the detected cell information from the radio network controller;
a detection count record unit that records the number of detection times that the relationship between the identification information of the handover original cell and the identification information of the cell as the detected expected movement destination is determined as not included in the relationship between the identification information of the handover original cell and the identification information of the adjacent cells recorded in the adjacent cell information, based on the collection of the detected cell information; and
an adjacent cell information additional-registration unit that additionally registers the relationship between the identification information of the handover original cell and the identification information of the adjacent cells corresponding to the number of detection times in the adjacent cell information, when the number of detection times exceeds a threshold value.

2. The mobile communication system according to claim 1, wherein the maintenance terminal comprises an additional recommendation information output unit that outputs the identification information of the handover original cell and the identification information of the adjacent cells corresponding to the number of detection times, as additional recommendation information for the adjacent cell information, when the number of detection times exceeds the threshold value, and wherein the adjacent cell information additional-registration unit additionally registers the relationship between the identification information of the handover original cell and the identification information of the adjacent cells corresponding to the number of detection times in the adjacent cell information, when an input of registration instruction information is received according to the additional recommendation information.

3. A maintenance terminal communicating with a plurality of base stations that constitute a plurality of cells as communication ranges, and a radio network controller that controls communication of mobile terminals in the cells, and registering adjacent cell information in the radio network controller, the adjacent cell information including identification information of a handover original cell and identification information of adjacent cells adjacent to the handover original cell in the movement of the mobile terminals, the maintenance terminal comprising;

a detected cell information collection unit that collects detected cell information including the identification information of the handover original cell and identification information of a cell as an expected movement destination from the radio network controller;

a detection count record unit that records the number of detection times that the relationship between the identification information of the handover original cell and the identification information of the cell as the detected expected movement destination is determined as not included in the relationship between the identification information of the handover original cell and the identification information of the adjacent cells recorded in the radio network controller, based on the collection of the detected cell information; and an adjacent cell information additional-registration unit that additionally registers the relationship between the identification information of the handover original cell and the identification information of the adjacent cells corresponding to the number of detection times in the adjacent cell information, when the number of detection times exceeds a threshold value.

4. An adjacent cell information optimizing method in a mobile communication system including a plurality of base stations that constitute a plurality of cells as communication ranges, a radio network controller that controls communication of mobile terminals in the cells, and a maintenance terminal that registers adjacent cell information in the radio network controller, the adjacent cell information including identification information of a handover original cell and identification information of adjacent cells adjacent to the handover original cell in the movement of the mobile terminals, the method comprising:

storing the adjacent cell information by an adjacent cell information storage unit of the radio network controller;

transmitting the adjacent cell information to the mobile terminals in the cells by an adjacent cell information communication unit of the radio network controller;

receiving detected cell information including the identification information of the handover original cell and identification information of a cell as an expected movement destination from a mobile terminal in which it is determined that a relationship between the identification information of the handover original cell and the identification information of the cell as the detected expected movement destination is not included in a relationship between the identification information of the handover original cell and the identification information of the adjacent cells recorded in the adjacent cell information, by a detected cell information reception unit of the radio network controller;

collecting the detected cell information from the radio network controller by a detected cell information collection unit of the maintenance terminal;

recording the number of detection times that the relationship between the identification information of the handover original cell and the identification information of the cell as the detected expected movement destination is determined as not included in the relationship between the identification information of the handover original cell and the identification information of the adjacent cells recorded in the adjacent cell information, based on the collection of the detected cell information, by a detection count record unit of the maintenance terminal; and additionally registering the relationship between the identification information of the handover original cell and the identification information of the adjacent cells corresponding to the number of detection times in the adjacent cell information, when the number of detection times exceeds a threshold value, by an adjacent cell information additional-registration unit, of the maintenance terminal.

5. An adjacent cell information optimizing method in a maintenance terminal communicating with a plurality of base stations that constitute a plurality of cells as communication ranges, and a radio network controller that controls communication of mobile terminals in the cells, and registering adjacent cell information in the radio network controller, the adjacent cell information including identification information of a handover original cell and identification information of adjacent cells adjacent to the handover original cell in the movement of the mobile terminals, the method comprising:

collecting detected cell information including the identification information of the handover original cell and identification information of a cell as an expected movement destination from the radio network controller by a detected cell information collection unit;

recording the number of detection times that the relationship between the identification information of the handover original cell and the identification information of the cell as the detected expected movement destination is determined as not included in the relationship between the identification information of the handover original cell and the identification information of the adjacent cells recorded in the adjacent cell information, based on the collection of the detected cell information, by a detection count record unit; and additionally registering the relationship between the identification information of the handover original cell and the identification information of the adjacent cells corresponding to the number of detection times in the adjacent cell information, when the number of detection times exceeds a threshold value, by an adjacent cell information additional-registration unit.

6. A program for causing a computer of a maintenance terminal communicating with a plurality of base stations that constitute a plurality of cells as communication ranges, and a radio network controller that controls communication of mobile terminals in the cells, and registering adjacent cell information in the radio network controller, the adjacent cell information including identification information of a handover original cell and identification information of adjacent cells adjacent to the handover original cell in the movement of the mobile terminals, the program executing:

a detected cell information collection process of collecting detected cell information including the identification information of the handover original cell and identification information of a cell as an expected movement destination from the radio network controller;

a detection number-of-times record process of recording the number of detection times that the relationship between the identification information of the handover original cell and the identification information of the cell as the detected expected movement destination is determined as not included in the relationship between the identification information of the handover original cell and the identification information of the adjacent cells recorded in the adjacent cell information, based on the collection of the detected cell information; and an adjacent cell information additional-registration process of additionally registering the relationship between the identification information of the handover original cell and the identification information of the adjacent cells corresponding to the number of detection times in the adjacent cell information, when the number of detection times exceeds a threshold value, 7. A computer-readable recording medium in which the program according to claim 6 is recorded.

* * * * *